(12) United States Patent
Vaidyanathan et al.

(10) Patent No.: US 7,756,648 B1
(45) Date of Patent: Jul. 13, 2010

(54) METHOD AND APPARATUS FOR FACILITATING IN-SITU VIBRATION TESTING OF DISK DRIVES

(75) Inventors: Kalyanaraman Vaidyanathan, San Diego, CA (US); Kenny C. Gross, San Diego, CA (US); John J. Cooley, Escondido, CA (US)

(73) Assignee: Oracle America, Inc., Redwood Shores, CA (US)

( * ) Notice: Subject to any disclaimer, the term of this patent is extended or adjusted under 35 U.S.C. 154(b) by 882 days.

(21) Appl. No.: 11/602,574

(22) Filed: Nov. 20, 2006

(51) Int. Cl.
*G01L 21/22* (2006.01)
*G06F 11/30* (2006.01)

(52) U.S. Cl. .................. 702/56; 369/44.32; 702/182

(58) Field of Classification Search ............... 702/54, 702/56, 57, 94, 113, 182; 369/44.32, 53.18, 369/52.28
See application file for complete search history.

(56) References Cited

U.S. PATENT DOCUMENTS 6,665,633 B2 * 12/2003 Fioravanti et al. ........... 702/182
7,164,629 B2 *  1/2007 Aman et al. ............. 369/44.32

* cited by examiner

*Primary Examiner*—John H Le
(74) *Attorney, Agent, or Firm*—Park, Vaughan & Fleming LLP

(57) ABSTRACT

A system that generates vibrations within a computer system. During operation, the system receives a desired vibration profile. Next, the system determines a sequence of disk operations for one or more disk drives within the computer system that generates vibrations which substantially matches the desired vibration profile. The system then performs the sequence of disk operations on the one or more disk drives to generate the vibrations.

21 Claims, 3 Drawing Sheets

METHOD AND APPARATUS FOR FACILITATING IN-SITU VIBRATION TESTING OF DISK DRIVES

BACKGROUND

1. Field of the Invention

The present invention relates to techniques for determining the reliability of components within a computer system.

2. Related Art

Enterprise computer systems often include a large number of hard disk drives. For example, a single server system can sometimes have as many as 48 internal hard disk drives or address over 100 external disk drives in a storage array. Losing data stored on these disk drives can have a devastating effect on an organization. For example, airlines rely on the integrity of data stored in their reservation systems for most of their day-to-day operations, and would essentially cease to function if this data became lost or corrupted. If fault-prone hard disk drives can be identified before they fail, preventative measures can be taken to avoid such failures.

Vibrations often cause disk drives to fail in a computer system. Hence, prior to shipping a computer system to a customer, vibration studies are sometimes performed on the disk drives to identify disk drives that are likely to fail when exposed to vibrations. Presently, the only technique that is used to perform such vibration studies on disk drives involves shaking the drives using a programmable shaker table, which introduces varying amplitudes and frequencies of vibrations to the disk drives. Unfortunately, this process of using a shaker table is time-consuming and expensive.

Hence, what is needed is a method and an apparatus for generating vibrations within a computer system to test the reliability of disk drives without the problems described above.

SUMMARY

One embodiment of the present invention provides a system that generates vibrations within a computer system. During operation, the system receives a desired vibration profile. Next, the system determines a sequence of disk operations for one or more disk drives within the computer system that generates vibrations which substantially matches the desired vibration profile. The system then performs the sequence of disk operations on the set of disk drives to generate the vibrations.

In a variation on this embodiment, the desired vibration profile can include: a waveform for a vibration signal produced by the vibrations; and an amplitude of the vibration signal.

In a further variation, the waveform for the vibration signal can include: a sinusoidal waveform; a square waveform; a saw-toothed waveform; or any other type of waveform.

In a variation on this embodiment, the sequence of disk operations can include: outer-track disk operations; inner-track disk operations; alternating inner-track disk operations and outer-track disk operations; random access disk operations; or a combination of disk operations.

In a further variation, the disk operations are only read operations.

In a further variation, the disk operations can include write operations.

In a variation on this embodiment, the system monitors performance parameters associated with the one or more disk drives while the vibrations are taking place. The system then determines whether the monitored performance parameters indicate that a disk drive under test is at the onset of degradation. If so, the system performs a remedial action.

In a further variation, while determining the sequence of disk operations, the system determines a sequence of disk operations for a subset of the one or more disk drives within the computer system which does not include a disk drive under test.

In a further variation, the system removes at least one disk drive from the computer system during the monitoring process.

In a further variation, the system substitutes higher capacity disk drives for at least disk drives in the computer system during the monitoring process.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Generating Vibrations within a Computer System

One embodiment of the present invention uses disk drives to generate vibrations within a computer system to facilitate detecting the onset of degradation in the computer system. Several advantages of this disk drive testing technique include:

(1) the disk drives do not need to be shipped to a facility with a shaker table;

(2) vibration testing can be conducted at repair centers, in manufacturing and Ongoing Reliability Testing (ORT) labs, and at customer sites; and (3) disk drives can be monitored while they are undergoing vibration testing using system telemetry, thereby making it possible to identify the exact time of an onset of degradation.

Figure 1A:
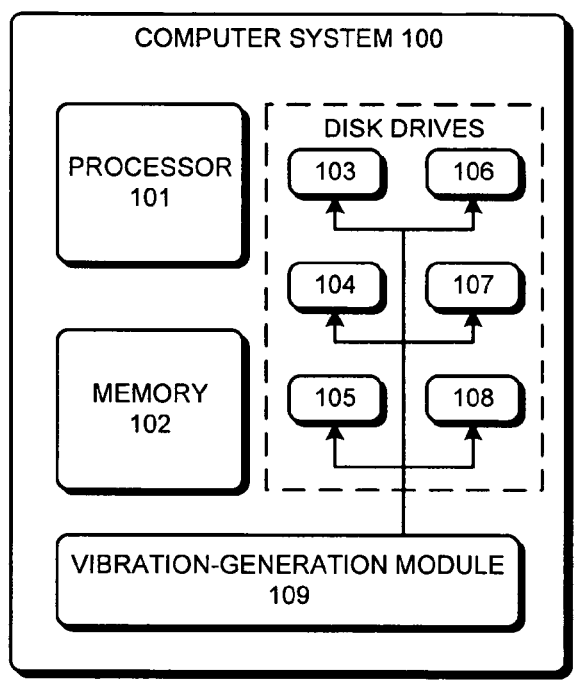
FIG. 1A presents a block diagram of a computer system in accordance with an embodiment of the present invention.

FIG. 1A presents a block diagram of a computer system 100 in accordance with an embodiment of the present invention. Computer system 100 includes processor 101, memory 102, disk drives 103-108, and vibration-generation module 109.

Processor 101 can generally include any type of processor, including, but not limited to, a microprocessor, a mainframe computer, a digital signal processor, a personal organizer, a device controller and a computational engine within an appliance. Memory 102 can include any type of memory, including but not limited to, dynamic random access memory (DRAM), static random access memory (SRAM), flash memory, and read only memory (ROM). Disk drives 103-108 can include any type of storage device that can be coupled to a computer system, including, but not limited to, magnetic, optical, and magneto-optical storage devices, as well as storage devices based on flash memory and/or battery-backed up memory. In one embodiment of the present invention, disk drives 103-108 are part of a storage array.

Figure 1B:
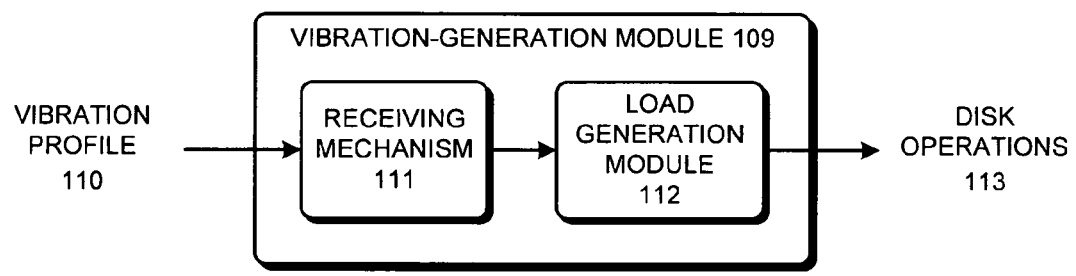
FIG. 1B presents a block diagram of a vibration-generation module in accordance with an embodiment of the present invention.

FIG. 1B presents a block diagram of vibration-generation module 109 in accordance with an embodiment of the present invention. Vibration-generation module 109 includes a receiving mechanism 111, which receives a vibration profile 110, and a load-generation module 112, which generates a sequence of disk operations 113 which can produce vibrations that substantially match vibration profile 110.

A number of different types of vibrations can be generated in this way. In one embodiment of the present invention, the vibration profile is periodic. In one embodiment of the present invention, the sequence of disk operations 113 can produce vibrations with varying vibration levels (i.e., measured in units of GRMS). In one embodiment of the present invention, vibration profile 110 can include a waveform for a vibration signal produced by the vibrations and the amplitude of the vibration signal. More specifically, the waveform for the vibration signal can include a sinusoidal waveform, a square waveform, a saw-toothed waveform, or any other type of waveform.

Different types of disk operations can be used to produce the desired vibrations. In one embodiment of the present invention, the sequence of disk operations 113 can include outer-track disk operations, inner-track disk operations, alternating inner-track disk operations and outer-track disk operations, random access disk operations, or a combination of disk operations. In one embodiment of the present invention, the disk operations are only read operations. In another embodiment of the present invention, the disk operations can include write operations.

In one embodiment of the present invention, after load-generation module 112 generates the sequence of disk operations 113, vibration-generation module 109 transmits the sequence of disk operations 113 to disk drives 103-108, which then perform the disk operations to produce vibrations that substantially match vibration profile 110. If the vibration profile is periodic, the sequence of disk operations 113 can be performed in a loop.

In one embodiment of the present invention, vibration-generation module 109 is integrated with a real-time telemetry system. Note that a real-time telemetry system is described in more detail with reference to FIG. 4 below.

Figure 2:
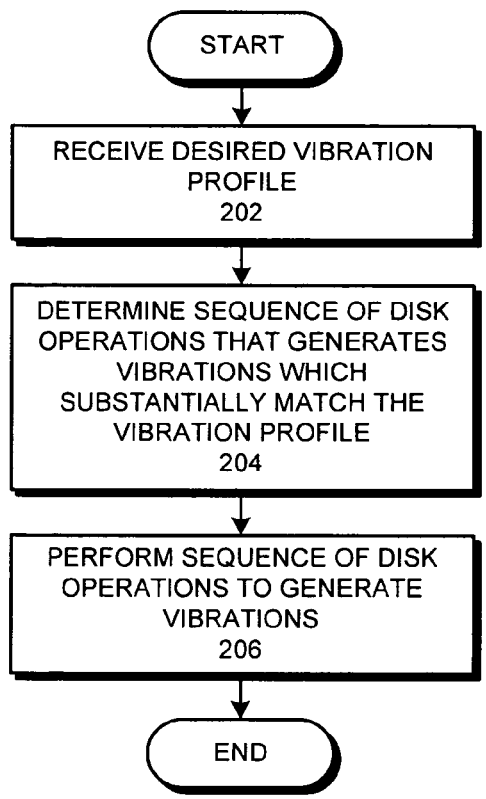
FIG. 2 presents a flow chart illustrating the process of generating vibrations within a computer system in accordance with an embodiment of the present invention.

FIG. 2 presents a flow chart illustrating the process of generating vibrations within a computer system in accordance with an embodiment of the present invention. The process begins when the system receives a desired vibration profile (step 202). Next, the system determines a sequence of disk operations for a set of disk drives within the computer system that generates vibrations which substantially match the desired vibration profile (step 204). The system then performs the sequence of disk operations on the set of disk drives to generate the vibrations (step 206).

One embodiment of the present invention uses system telemetry to continuously monitor disk drives during vibration testing. For example, telemetry variables such as read/write activity and error counts of the individual disk drive can be monitored to detect the onset of degradation in the disk drives.

Figure 3:
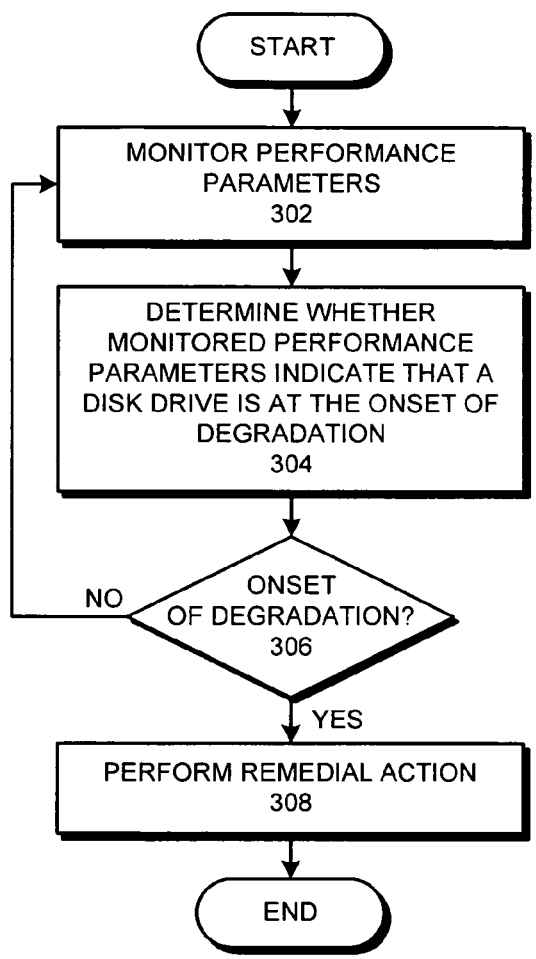
FIG. 3 presents a flow chart illustrating the process of detecting the onset of degradation in a disk drive within a computer system in accordance with an embodiment of the present invention.

FIG. 3 presents a flow chart illustrating the process of detecting the onset of degradation in a disk drive within a computer system in accordance with an embodiment of the present invention. Note that this process uses a real-time telemetry system discussed with reference to FIG. 4 below. The process begins when the system monitors performance parameters associated with the set of disk drives while the vibrations are taking place (step 302). The system then determines whether the monitored performance parameters indicate that a disk drive (or the computer system) under test is at the onset of degradation (step 304). If so (step 306—yes), the system performs a remedial action (step 308). Otherwise (step 306—no), the system returns to step 302. In one embodiment of the present invention, the remedial action can include replacing disk drives that are at the onset of degradation, replacing the computer system, notifying a system administrator, or failing-over to another computer system or disk drive.

In one embodiment of the present invention, while determining the sequence of disk operations, the system determines a sequence of disk operations for a subset of disk drives which does not include a disk drive under test. In this way, the system tests the disk drive under test using vibrations generated by the other disk drives within the computer system.

The presence of a disk drive within a storage array can affect the vibrations generated. For example, different modes of vibrations can be produced with the presence or absence of disk drives at specific locations within the computer system. Hence, one or more disk drives can be removed from the computer system during the monitoring process to test different system configurations. Similarly, the presence of higher capacity drives can affect the vibrations generated by the disk operations. Hence, one embodiment of the present invention substitutes higher capacity disk drives for one or more disk drives in the computer system during the monitoring process.

Real-Time Telemetry System

Figure 4:
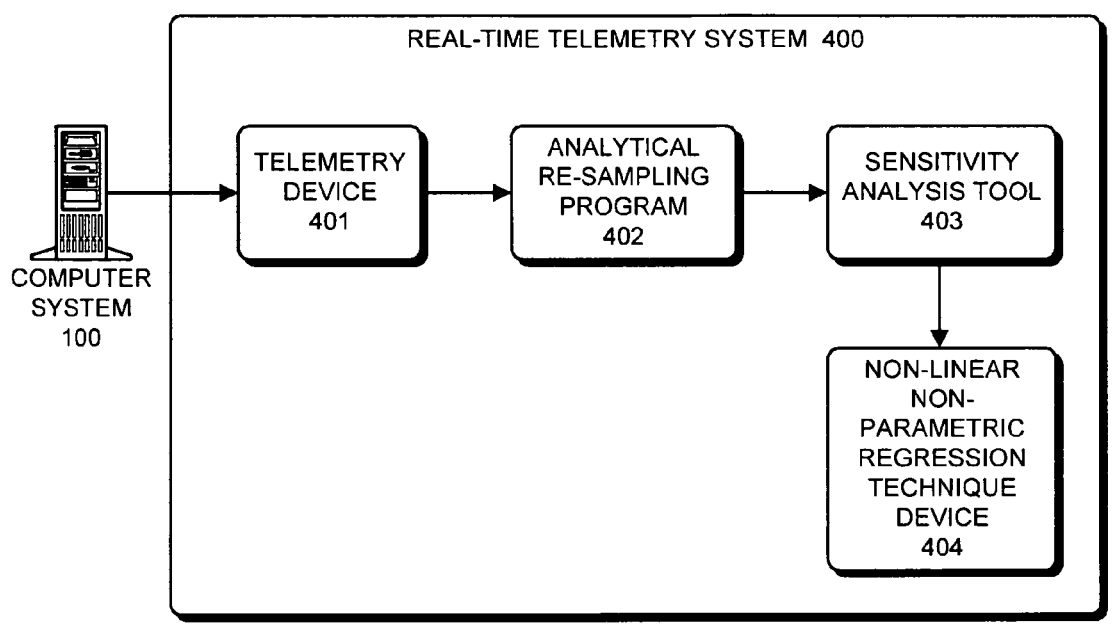
FIG. 4 presents a block diagram of a real-time telemetry system in accordance with an embodiment of the present invention.

FIG. 4 presents a block diagram of a real-time telemetry system 400 which monitors computer system 100 in accordance with an embodiment of the present invention. Real-time telemetry system 400 contains telemetry device 401, analytical re-sampling program 402, sensitivity analysis tool 403, and non-linear, non-parametric (NLNP) regression technique device 404. Telemetry device 401 gathers information from the various sensors and monitoring tools within computer system 100, and directs the signals to local or remote locations that contain analytical re-sampling program 402, sensitivity analysis tool 403, and NLNP regression technique device 404. In one embodiment of the present invention, analytical re-sampling program 402, sensitivity analysis tool 403, and NLNP regression technique device 404 are located within computer system 100. In another embodiment of the present invention, analytical re-sampling program 402, sensitivity analysis tool 403, and NLNP regression technique device 404 are located on a plurality of computer systems including computer system 100 and other remote computer systems.

The analytical re-sampling program 402 ensures that the signals have a uniform sampling rate. In doing so, analytical re-sampling program 402 uses interpolation techniques, if necessary, to fill in missing data points, or to equalize the sampling intervals when the raw data is non-uniformly sampled.

After the signals pass through analytical re-sampling program 402, they are aligned and correlated by sensitivity analysis tool 403. For example, in one embodiment of the present invention sensitivity analysis tool 403 incorporates a novel moving window technique that "slides" through the signals with systematically varying window widths. The sliding windows systematically vary the alignment between windows for different signals to optimize the degree of association between the signals, as quantified by an "F-statistic," which is computed and ranked for all signal windows by sensitivity analysis tool 403.

For statistically comparing the quality of two fits, F-statistics reveal the measure of regression. The higher the value of the F-statistic, the better the correlation is between two signals. The lead/lag value for the sliding window that results in the F-statistic with the highest value is chosen, and the candidate signal is aligned to maximize this value. This process is repeated for each signal by sensitivity analysis tool 403.

Signals that have an F-statistic very close to 1 are "completely correlated" and can be discarded. This can result when two signals are measuring the same metric, but are expressing them in different engineering units. For example, a signal can convey a temperature in degrees Fahrenheit, while a second signal conveys the same temperature in degrees Centigrade. Since these two signals are perfectly correlated, one does not contain any additional information over the other, and therefore, one may be discarded.

Some signals may exhibit little correlation, or no correlation whatsoever. In this case, these signals may be dropped as they add little predictive value. Once a highly correlated subset of the signals has been determined, they are combined into one group or cluster for processing by the NLNP regression technique device 404.

Non-Linear, Non-Parametric Regression

In one embodiment of the present invention, the NLNP regression technique is a multivariate state estimation technique (MSET). The term "MSET" as used in this specification refers to a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000. This paper outlines several different pattern recognition approaches. Hence, the term "MSET" as used in this specification can refer to (among other things) any technique outlined in [Gribok], including Ordinary Least Squares (OLS), Support Vector Machines (SVM), Artificial Neural Networks (ANNs), MSET, or Regularized MSET (RMSET).

The present invention uses an advanced pattern recognition approach, which takes data gathered from software variables reported by the operating system, hardware variables generated by the sensors in the computer system, and a model of a properly-functioning disk drive which is generated during a training phase, to determine whether a disk drive is at the onset of degradation.

The present invention continuously monitors a variety of instrumentation signals in real time during operation of the server. (Note that although we refer to a single computer system in this disclosure, the present invention also applies to a collection of computer systems).

These instrumentation signals can also include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

These instrumentation signals can also include signals associated with canary performance parameters for synthetic user transactions, which are periodically generated for the purpose of measuring quality of service from the end user's perspective.

These instrumentation signals can additionally include hardware variables, including, but not limited to, internal temperatures, voltages, currents, and fan speeds.

Furthermore, these instrumentation signals can include disk-related metrics for a storage devices such as disk drives, including, but not limited to, average service time, average response time, number of kilobytes (kB) read per second, number of kB written per second, number of read requests per second, number of write requests per second, and number of soft errors per second.

The foregoing instrumentation parameters are monitored continuously with an advanced statistical pattern recognition technique. One embodiment of the present invention uses a class of techniques known as non-linear, non-parametric (NLNP) regression techniques, such as the MSET. Alternatively, the present invention can use other pattern recognition techniques, such as neural networks or other types of NLNP regression. Another embodiment of the present invention uses a linear regression technique. In each case, the pattern recognition module "learns" how the behavior of the monitored variables relates to a properly-functioning disk drive. The pattern recognition module then generates a model of the properly-functioning disk drive that is used to determine whether a disk drive is at the onset of degradation.

In one embodiment of the present invention, the system components from which the instrumentation signals originate are field replaceable units (FRUs), which can be independently monitored. Note that all major system units, including both hardware and software, can be decomposed into FRUs. (For example, a software FRU can include: an operating system, a middleware component, a database, or an application.)

Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating vibrations within a computer system, comprising:
   receiving a desired vibration profile;
   determining a sequence of disk operations for one or more disk drives within the computer system that generates vibrations which substantially matches the desired vibration profile;
   generating the vibrations by performing the sequence of disk operations on the set of disk drives;
   monitoring performance parameters associated with the one or more disk drives while the vibrations are taking place; and
   determining whether the monitored performance parameters indicate that a disk drive under test is at the onset of degradation.

2. The method of claim 1, wherein the desired vibration profile can include:
   a waveform for a vibration signal produced by the vibrations; and
   an amplitude of the vibration signal.

3. The method of claim 2, wherein the waveform for the vibration signal can include:
   a sinusoidal waveform;
   a square waveform;
   a saw toothed waveform; or
   any other type of waveform.

4. The method of claim 1, wherein the sequence of disk operations can include:
   outer track disk operations;
   inner track disk operations;
   alternating inner track disk operations and outer track disk operations;
   random access disk operations; or
   a combination of disk operations.

5. The method of claim 4, wherein the disk operations are only read operations.

6. The method of claim 4, wherein the disk operations can include write operations.

7. The method of claim 1, further comprising performing a remedial action if the monitored performance parameters indicate that a disk drive under test if at the onset of degradation.

8. The method of claim 7, wherein determining the sequence of disk operations involves determining a sequence of disk operations for a subset of the one or more disk drives within the computer system which does not include a disk drive under test.

9. The method of claim 7, wherein the method further comprises removing at least one disk drive from the computer system during the monitoring process.

10. The method of claim 7, wherein the method further comprises substituting higher capacity disk drives for at least one disk drive in the computer system during the monitoring process.

11. A computer-readable storage medium storing instructions that when executed by a computer cause the computer to perform a method for generating vibrations within a computer system, wherein the method comprises:
    receiving a desired vibration profile;
    determining a sequence of disk operations for one or more of disk drives within the computer system that generates vibrations which substantially matches the desired vibration profile;
    performing the sequence of disk operations on the one or more disk drives to generate the vibrations;
    monitoring performance parameters associated with the one or more disk drives while the vibrations are taking place; and
    determining whether the monitored performance parameters indicate that a disk drive under test is at the onset of degradation.

12. The computer-readable storage medium of claim 11, wherein the desired vibration profile can include:
    a waveform for a vibration signal produced by the vibrations; and
    an amplitude of the vibration signal.

13. The computer-readable storage medium of claim 12, wherein the waveform for the vibration signal can include:
    a sinusoidal waveform;
    a square waveform;
    a saw toothed waveform; or
    any other type of waveform.

14. The computer-readable storage medium of claim 11, wherein the sequence of disk operations can include:
    outer track disk operations;
    inner track disk operations;
    alternating inner track disk operations and outer track disk operations;
    random access disk operations; or
    a combination of disk operations.

15. The computer-readable storage medium of claim 14, wherein the disk operations are only read operations.

16. The computer-readable storage medium of claim 14, wherein the disk operations can include write operations.

17. The computer-readable storage medium of claim 11, wherein the method further comprises performing a remedial action if the monitored performance parameters indicate that a disk drive under test if at the onset of degradation.

18. The computer-readable storage medium of claim 17, wherein determining the sequence of disk operations involves determining a sequence of disk operations for a subset of the one or more disk drives within the computer system which does not include a disk drive under test.

19. The computer-readable storage medium of claim 17, wherein the method further comprises removing at least one disk drive from the computer system during the monitoring process.

20. The computer-readable storage medium of claim 17, wherein the method further comprises substituting higher capacity disk drives for at least one disk drives in the computer system during the monitoring process.

21. An apparatus that generates vibrations within a computer system, comprising:
    a receiving mechanism configured to receive a desired vibration profile; and
    a load generation mechanism configured to:
    determine a sequence of disk operations for one or more of disk drives within the computer system that generates vibrations which substantially matches the desired vibration profile;
    perform the sequence of disk operations on the one or more disk drives to generate the vibrations;
    monitor performance parameters associated with the one or more disk drives while the vibrations are taking place; and to
    determine whether the monitored performance parameters indicate that a disk drive under test is at the onset of degradation.

* * * * *